(12) United States Patent
Melmon et al.

(10) Patent No.: US 7,792,788 B2
(45) Date of Patent: Sep. 7, 2010

(54) METHOD AND SYSTEM FOR RESOLVING CONFLICTS OPERATIONS IN A COLLABORATIVE EDITING ENVIRONMENT

(75) Inventors: Keith Melmon, Bellevue, WA (US); David A. Nichols, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 827 days.

(21) Appl. No.: 11/073,418

(22) Filed: Mar. 4, 2005

(65) Prior Publication Data

US 2006/0200755 A1    Sep. 7, 2006

(51) Int. Cl.
  *G06F 7/00*  (2006.01)
  *G06F 17/00*  (2006.01)
(52) U.S. Cl. .................. 707/608; 707/705; 709/205
(58) Field of Classification Search .............. None
  See application file for complete search history.

(56) References Cited

U.S. PATENT DOCUMENTS

| | | | | |
|---|---|---|---|---|
| 5,220,657 | A * | 6/1993 | Bly et al. ................... | 711/152 |
| 6,529,905 | B1 * | 3/2003 | Bray et al. .................. | 707/8 |
| 6,615,223 | B1 * | 9/2003 | Shih et al. .................. | 707/201 |
| 6,631,412 | B1 * | 10/2003 | Glasser et al. ............. | 709/224 |
| 6,640,244 | B1 * | 10/2003 | Bowman-Amuah ........ | 709/207 |
| 6,701,345 | B1 * | 3/2004 | Carley et al. .............. | 709/205 |
| 6,725,452 | B1 * | 4/2004 | Te'eni et al. .............. | 717/168 |
| 6,938,070 | B2 * | 8/2005 | Esposito .................... | 709/205 |
| 7,136,903 | B1 * | 11/2006 | Phillips et al. ............. | 709/217 |
| 7,249,314 | B2 * | 7/2007 | Walker et al. .............. | 715/511 |
| 7,624,145 | B2 * | 11/2009 | Junuzovic et al. .......... | 709/205 |
| 2004/0267676 | A1 * | 12/2004 | Feng et al. ................. | 705/400 |

OTHER PUBLICATIONS

Oracle 8i Parallel Server, Release 8.1.5 Feb. 1999.*
"The Lifecycle of Content—Where does Groove fit with respect to SharePoint and other centralized document sharing systems?" Groove and SharePoint, Work-Share-Store, © 2000-2004 Groove Networks, Inc.
C.A. Ellis, S.J. Gibbs, "Concurrency Control in Groupware Systems, " pp. 399-407, MCC, Austin, Texas, 1989 ACM.
Security Services, Groove Virtual Office at a Glance, © 2000-2004 Groove Networks, Inc.
David A. Nichols, Pavel Curtis, Michael Dixon, and John Lamping, "High-Latency, Low-Bandwidth Windowing in the Jupiter Collaboration System," UIST'95 Nov. 14-17, 1995, pp. 111-120.

(Continued)

*Primary Examiner*—Pierre M Vital
*Assistant Examiner*—Loan T Nguyen
(74) *Attorney, Agent, or Firm*—Perkins Coie LLP

(57) ABSTRACT

A collaborative editing system defines operational transforms for transforming conflicting operations on styles of the text of the document. The operational transforms ensure that local copies of the document will be consistent when it is in a quiescent state. The operational transforms are defined so that most conflicts can be resolved based on analysis of a remote operation and a local operation only. Certain conflicts, however, cannot be resolved based solely on analysis of the local and remote operations themselves. Such a conflict is referred to as a "definite conflict." The collaborative editing system resolves definite conflicts by designating one of the computer systems as a distinguished computer system and giving priority to its operation. When a definite conflict arises, then the local computer system and the remote computer system recognize the conflict and resolve the conflict in favor of the operation of the distinguished computer system.

17 Claims, 4 Drawing Sheets

OTHER PUBLICATIONS

Architecture, Groove Virtual Office at a Glance, © 2000-2005 Groove Networks.

Getting Started Guide, groove virtual office, pp. 1-17, © 2000-2005 Groove Networks, Inc.

Product Backgrounder, Groove Virtual Office, pp. 1-11, © 2000-2005 Groove Networks, Inc.

Groove virtual office quick reference guide, Groove Virtual Office Basics.

User's Guide for Groove Virtual Office 3.1, pp. 1-254.

* cited by examiner

METHOD AND SYSTEM FOR RESOLVING CONFLICTS OPERATIONS IN A COLLABORATIVE EDITING ENVIRONMENT

TECHNICAL FIELD

The described technology relates generally to collaborative editing of data and particularly to resolving conflicts in operations performed on the data.

BACKGROUND

Collaborative editing systems have been used to allow multiple users to simultaneously update shared data. For example, the users may be collaborating to generate a text document in which the users may be modifying various portions of the text document simultaneously. Several different models can be used in collaborative editing systems. In a centralized model, a server computer system maintains a master copy of the document and each user's client computer system maintains a slave copy. When a user requests to modify the document, the user's client computer system sends a modify request to the server computer system. Upon receiving the modify request, the server computer system modifies the master copy of the document and sends a modify notification to each client computer system. Upon receiving the modify notification, a client computer system updates its local copy of the document. The disadvantage of the centralized model is that a user who modifies a document needs to wait until the corresponding modify notification from the server is received for the modification to take place. In many instances, the delay resulting from waiting for the modify notification can be unacceptable to the user. In a distributed model, each user's computer system maintains a local copy of the document. When a user modifies the document, it is immediately reflected in the local copy and a modify notification is sent to the other user computer systems. When those user computer systems receive the modify notification, they modify their local copy of the document accordingly. The distributed model has the advantage that users see the effects of their modifications immediately without having to wait for the delay inherent in a round-trip communication with a server computer system. The distributed model, however, is more complex than the centralized model because of conflicting modifications by users that need to be resolved.

Conflicting modifications occur in the distributed model because one user may be modifying a certain portion of a document and a different user may also be modifying that same portion of the document. For example, a first user may delete the third paragraph from the document at the same time that a second user is inserting a new paragraph before the first paragraph of the document. When the first user's computer system receives the notification to insert a new first paragraph, it does so. When the second user's computer system receives the notification to delete the third paragraph, if it proceeds to delete the third paragraph, it will delete what is now the second paragraph of the first user's local copy. As a result, the local copies of the first user and the second user will be inconsistent. Such editing operations are said to conflict.

The resolution of conflicting operations in a collaborative editing environment has been studied extensively. One technique for resolving conflicting operations is referred to as "operational transformation." See C. A. Ellis and S. J. Gibbs, "Concurrency Control in Groupware Systems," *Proc. 1989 ACM SIGMOD International Conference on the Management of Data*, June 1989, pp. 399-407. A collaborative editing system that uses operational transformation techniques transforms conflicting operations so that the local copies of the data are kept consistent when the document is in a quiescent state, that is, when all modifications have already been applied to all copies of the document. In the example above, when the second user's computer system receives the notification to delete the third paragraph, it will detect that the first user's computer system did not insert the paragraph before the first user deleted the third paragraph. As such, the second user's computer system can use operational transformation to transform the notification to delete the third paragraph into a notification to delete the fourth paragraph. When the second user's computer system then applies the transformed operation, it will delete the same paragraph that the first user deleted and the local copies of the document will thus be consistent.

The resolution of conflicting operations has, however, not been applied to resolving conflicts when only attributes or styles of the characters of a document are being modified. For example, a first user may want to italicize a certain sentence in the document, and a second user may want to bold the entire paragraph that contains the sentence. Traditionally, the modifying of the style of text in the document has been effected by simply replacing the text with the same text but with a new style. However, the replacing of text when only the style of the text changes may lead to undesirable and unnecessarily restricted outcomes. It would be desirable to have a technique for resolving conflicts related to the style of the text of the document and more generally to attributes of objects of data.

SUMMARY

A method and system for transforming operations on attributes of data having objects in a collaborative editing environment with multiple computer systems is provided. A collaborative editing system defines operational transforms for transforming conflicting operations on styles of the text of the document. The operational transforms ensure that local copies of the document will be consistent when it is in a quiescent state. The operational transforms are defined so that most conflicts can be resolved based on analysis of a remote operation and a local operation only. Certain conflicts, however, cannot be resolved based solely on analysis of the local and remote operations themselves. Such a conflict is referred to as a "definite conflict." The collaborative editing system resolves definite conflicts by designating one of the computer systems as a distinguished computer system and giving priority to its operation. When a definite conflict arises, then the local computer system and the remote computer system recognize the conflict and resolve the conflict in favor of the operation of the distinguished computer system.

DETAILED DESCRIPTION

Figure 1:
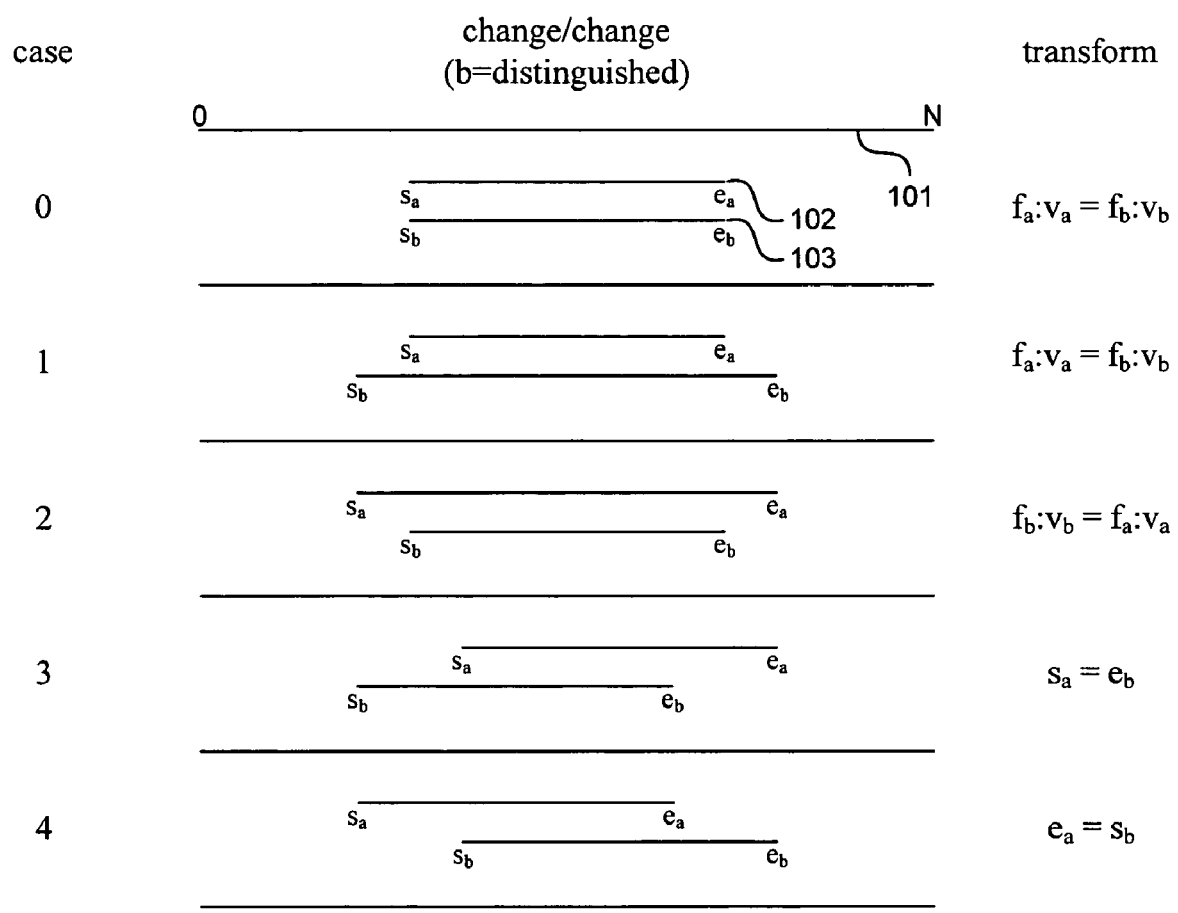
FIG. 1 illustrates various operational transforms when the conflicting operations are both change style operations in one embodiment.

A method and system for transforming operations on attributes of data having objects in a collaborative editing environment with multiple computer systems is provided. In one embodiment, a collaborative editing system defines operational transforms for transforming conflicting operations on styles of the text of the document. The style or format of text refers to attributes such as italics, bold, underline, font type, font size, and so on. The operational transforms ensure that local copies of the document will be consistent when it is in a quiescent state. The operational transforms are defined so that most conflicts can be resolved based on analysis of a remote operation and a local operation only. If the remote operation was generated after the remote computer system applied the local operation, then no conflict occurs and the local computer system can apply the remote operation to its local copy of the document. If, however, the remote operation was generated at the remote computer system before the local operation was applied at the remote computer system, then a conflict may occur. For example, when the range of text of the local operation encapsulates the range of text of the remote operation, then the local computer system may transform the remote operation so that it has no effect on the local copy, leaving the effects of the local operation intact. Conversely, the remote computer system, upon detecting that the local operation encapsulates the range of text of the remote operation, may perform no transformation on the local operation so that when the local operation is applied it will overwrite the effects of the remote operation. Thus, both the local copy and the remote copy will be in a consistent state. Certain conflicts, however, cannot be resolved based solely on analysis of the local and remote operations themselves. For example, when a local operation changes a particular style type to a style value (e.g., font size to 12) of the text in a certain range, and a remote operation changes the same style type to a different style value (e.g., font size to 10) of the text for that same range, the local computer system and the remote computer system are not able to identify how to resolve the conflict. Such a conflict is referred to as a "definite conflict." The collaborative editing system resolves definite conflicts by designating one of the computer systems as a distinguished computer system and giving priority to its operation. When a definite conflict arises, then the local computer system and the remote computer system recognize the conflict and resolve the conflict in favor of the operation of the distinguished computer system. For example, if the local computer system is designated as the distinguished computer system, then changes to the style of the same range by the local computer system and the remote computer system that are definite conflicts will be resolved in favor of the style provided by the local computer system. For example, if the local computer system changes the font size to 12-point in the range and the remote computer system changes the font size to 10-point in the range, then when the local computer system receives the remote operation it will detect the conflict and disregard the remote operation (e.g., transform it to a no operation) because the local computer system is the distinguished computer system. When, however, the remote computer system receives the local operation, it will also detect the conflict but will apply the local operation because the local computer system is the distinguished computer system. The result of applying the local operation is to overwrite the effect of the remote operation. Thus, the local and the remote copy of the document are maintained in a consistent state.

An operation may be defined by an operator, a range, and a parameter. The operators may be either a replace text operator or a change style operator. The parameter associated with the replace text operator provides the text that is to replace the text in the specified range. For example, if the document contains the text "abcdef" then an operation to replace the third and fourth characters of the document "cd" with "xyz" would be (R,3-5,"xyz"). After this operation is applied, the text would be "abxyzef." The parameter associated with the change style operator provides the style that is to be applied to the text in the range. For example, if the document contains the text "abcdef" then an operation to change the style of the third and fourth characters of the document to a underline style type with a underline on style value would be (C,3-5,underline:u). After this operation is applied, the text would be "ab<u>cd</u>ef." When changes to the same range specify different style types, then no conflicts occur. For example, the local computer may change the range to italics, and the remote computer system may change the range to bold. Regardless of the ordering of the changes, both computers will end up with the range in both italics and bold. When changes to the same range specify the same style type but different style values, then a definite conflict occurs. For example, the local computer system may change the range to a font type of times roman and the remote computer system may change the font type to arial. A definite conflict arises because a character cannot have a font type of both times roman and arial at the same time.

FIG. 1 illustrates various operational transforms when the conflicting operations are both change style operations in one embodiment. In this illustration, the various cases are illustrated graphically and the associated transform is shown to the right. The terms $s_a$ and $e_a$ referred to as the start and end of the range for operation a of computer system a, and the terms $s_b$ and $e_b$ referred to the start and end of the range for operation b of computer system b. In this illustration, computer system b is designated as the distinguished computer system. Thus, the operations for computer systems a and b are defined as follows:

$$O_a = (C, s_a - e_a, f_a : v_a) \quad (1)$$

$$O_b = (C, s_b - e_b, f_b : v_b) \quad (2)$$

where $O_a$ represents operation a, $O_b$ represents operation b, $f_a$ represents the style type of operation a, $v_a$ represents the style value of style type $f_a$, $f_b$ represents the style type of operation b, and $v_b$ represents the style value of style type $f_b$b. Line 101 represents the full range of the document, and lines 102 and 103 illustrate the ranges of the document covered by $O_a$ and $O_b$, respectively. In this example, lines 102 and 103 represent the same range.

Case 0 occurs when the ranges and style types of both style operations are identical but their style values are different. The transform for case 0 is as follows:

$$f_a : v_a = f_b : v_b \quad (3)$$

When computer system b (the distinguished computer system) receives $O_a$, it will transform the style of $O_a$, which is $f_a : v_a$, to that of $O_b$, which is $f_b : v_b$. The transformed operation can be represented as follows:

$$O_a' = (C, s_a - e_a, f_b : v_b) \quad (4)$$

where $O_a'$ represents the transformed operation a that is applied at computer system b. Since no transform is defined for $O_b$, computer system a applies $O_b$ without transformation.

Case 1 occurs when the range of the operation b encapsulates the range of the operation a and the style types of the operations are the same but their style values are different. The transform for case 1 is as follows:

$$f_a:v_a=f_b:v_b \quad (5)$$

When computer system b (defining the encapsulating range) receives $O_a$, it will transform the style of $O_a$, which is $f_a:v_a$, to that of $O_b$, which is $f_b:v_b$. The transformed operation can be represented as follows:

$$O_a'=(C,s_a-e_a,f_b:v_b) \quad (6)$$

Since no transform is defined for $O_b$, computer system a applies $O_b$ without transformation.

Case 2 occurs when the range of the operation a encapsulates the range of operation b and the style types of the operations are the same but their style values are different. The transform for case 2 is as follows:

$$f_b:v_b=f_a:v_a \quad (7)$$

When computer system a (defining the encapsulating range) receives $O_b$, it will transform the style of $O_b$, which is $f_b:v_b$, to that of $O_a$, which is $f_a:v_a$. The transformation can be represented as follows:

$$O_b'=(C,s_b-e_b,f_a:v_a) \quad (8)$$

where $O_b'$ represents the transformed operation b that is applied at computer system a. Since no transform is defined for $O_a$, computer system a applies $O_a$ without transformation. Cases 1 and 2 implement a strategy in which when both operations are change style operations for the same style type but with different style values and one range encapsulates another, the encapsulating range takes priority.

Case 3 occurs when the range for operation b (of the distinguished computer system) starts before the range for operation a and overlaps the range without encapsulating it. The transform for case 3 is as follows:

$$s_a=e_b \quad (9)$$

When computer system b receives $O_a$, it will transform the start of the range of $O_a$ to be equal to the end of the range of $O_b$. The transformed operation can be represented as follows:

$$O_a'=(C,e_b-e_a,f_a:v_a) \quad (10)$$

Since no transform is defined for $O_b$, computer system a applies $O_b$ without modification.

Case 4 occurs when the range for operation b (the distinguished computer system) starts within the range of operation a without being encapsulated. The transform for case 4 is as follows:

$$e_a=s_b \quad (11)$$

When computer system b receives $O_a$, it will transform the end of the range of $O_a$ to be equal to the start of the range of $O_b$. The transformed operation can be represented as follows:

$$O_a'=(C,s_a-s_b,f_a:v_a) \quad (12)$$

Since no transform is defined for $O_b$, computer system a applies $O_b$ without modification.

Cases 0, 3, and 4 represent definite conflicts in which the operation of the distinguished computer system is given priority to resolve the conflict.

Figure 2:
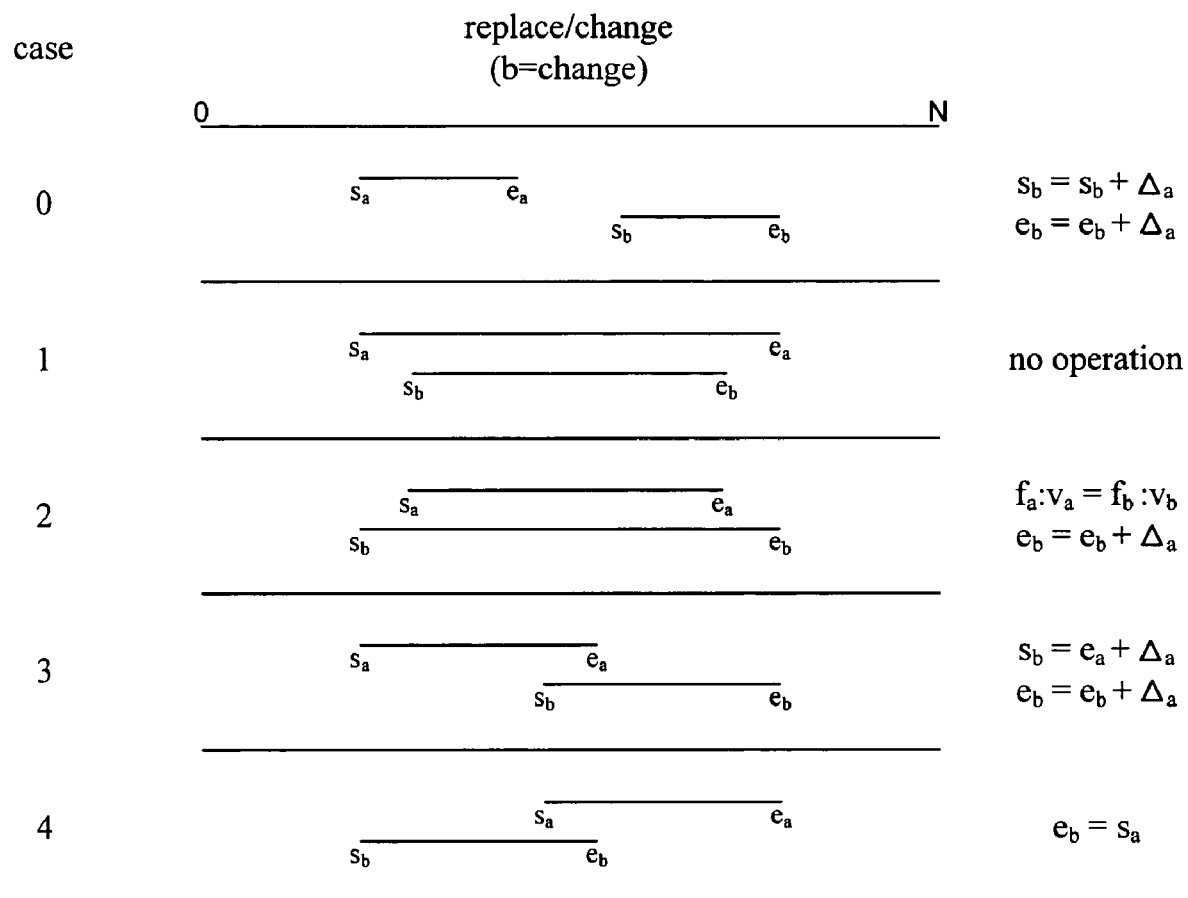
FIG. 2 illustrates various operational transforms when one conflicting operation is a replace text operation and the other is a change style operation in one embodiment.

FIG. 2 illustrates various operational transforms when one conflicting operation is a replace text operation and the other is a change style operation in one embodiment. Since none of these operational transforms are definite conflicts, the knowledge of a distinguished computer system is not needed. In this illustration, computer system a generates the replace text operation, and computer system b generates the change style operation.

Case 0 occurs when the entire range for operation a is before the range for operation b. The transform for case 0 is as follows:

$$s_b=s_b+\Delta_a \quad (13)$$

$$e_b=e_b+\Delta_a \quad (14)$$

where $\Delta_a$ represents the difference in the number of characters between the replacing text and replaced text, also referred to as the delta of the operation. The transformation can be represented as follows:

$$O_b'=(C,s_b+\Delta_a-e_b+\Delta_a,f_b:v_b) \quad (15)$$

where $O_b'$ represents the transformed operation b that is applied at computer system a. Since no transform is defined for $O_a$, computer system a applies $O_a$ without transformation.

Case 1 occurs when the range of operation a encapsulates the range of operation b. The transform for case 1 changes the $O_b$ to a no operation. The transformed operation can be represented as follows:

$$O_b'=(C,0-0,f_b:v_b) \quad (16)$$

Since no transform is defined for $O_a$, computer system a applies $O_a$ without transformation.

Case 2 occurs when the range of operation a is encapsulated by the range of operation b. The transform for case 2 is as follows:

$$f_a:v_a=f_b:v_b \quad (17)$$

$$e_b=e_b+\Delta_a \quad (18)$$

This transformation transforms the style of the operation to the style of operation b and adjusts the end of the range of $O_b$ by the delta of $O_a$. The transformed operation can be represented as the following:

$$O_a'=(R,s_a-e_a,f_b:v_b) \quad (19)$$

$$O_b'=(C,s_b-e_b+\Delta_a,f_b:v_b) \quad (20)$$

where $O_a'$ represents the transformed operation a that is applied at computer system b and $O_b'$ represents the transformed operation b that is applied at computer system a.

Case 3 occurs when the range of operation a starts before the range of operation b and overlaps it but does not encapsulate it. The transform for case 3 is as follows:

$$s_b=e_a+\Delta_a \quad (21)$$

$$e_b=e_b+\Delta_a \quad (22)$$

The transform shortens the range for operation b so that it no longer overlaps the range of operation a and adjusts the range of operation b by the delta of operation a. The transformation can be represented as the following:

$$O_b'=(e_a+\Delta_a,e_b+\Delta_a,f_b:v_b) \quad (23)$$

where $O_b'$ represents the transformed operation of computer system b that is applied at computer system a. Since no transform is defined for $O_a$, computer system a applies $O_a$ without modification.

Case 4 occurs when the range of operation b starts before the range of operation a and overlaps it but does not encapsulate it. The transform for case 4 is as follows:

$$e_b = s_a \quad (24)$$

The transform shortens the range of operation b so that it does not overlap the range of operation a. The transformation can be represented as the following:

$$O_b' = (C, s_b - s_a, f_b, v_b) \quad (25)$$

Since no transform is defined for $O_a$, computer system a applies $O_a$ without transformation.

Table 1 provides examples illustrating transformations when the operations are both change style operations that change the underline style type to different style values (i.e., underline or no underline). Each case includes 5 lines. The first line illustrates the text of the document at each computer system. The second line illustrates the operation performed locally at the computer system. The third line illustrates the document after the operation is performed. The fourth line illustrates the transformation of the operation received from the other computer system. The fifth line illustrates the document after the transformed operation is performed. Note: "nu" indicates no underline and "u" indicates underline for the style value.

TABLE 1

| Computer b | Change/Change | Computer a |
|---|---|---|
| abc_def | Case 0 | abc_def |
| (C, 2-5, nu) | | (C, 2-5, u) |
| abcdef | | abcdef |
| (C, 2-5, u)→(C, 2-5, nu) | | (C, 2-5, nu)→(C, 2-5, nu) |
| abcdef | | abcdef |
| abc_def | Case 1 | abc_def |
| (C, 2-5, nu) | | (C, 4-5, u) |
| abcdef | | abcdef |
| (C, 3-4, u)→(C, 3-4, nu) | | (C, 2-5, nu)→(C, 2-5, nu) |
| abcdef | | abcdef |
| abc_def | Case 2 | abc_def |
| (C, 3-4, nu) | | (C, 2-5, u) |
| abcdef | | abcdef |
| (C, 2-5, u)→(C, 2-5, u) | | (C, 3-4, nu)→(C, 3-4, u) |
| abcdef | | abcdef |
| abc_def | Case 3 | abc_def |
| (C, 2-4, nu) | | (C, 3-5, u) |
| abcdef | | abcdef |
| (C, 3-5, u)→(C, 4-5, u) | | (C, 2-4, nu)→(C, 2-4, nu) |
| abcdef | | abcdef |
| abc_def | Case 4 | abc_def |
| (C, 3-5, nu) | | (C, 2-4, u) |
| abcdef | | abcdef |
| (C, 2-4, u)→(C, 2-3, u) | | (C, 3-5, nu)→(C, 3-5, nu) |
| abcdef | | abcdef |

Table 2 provides examples illustrating transformations when one operation is a change style operation and the other operation is a replace text operation. Each case includes 5 lines. The first line illustrates the text of the document at each computer system. The second line illustrates the operation performed locally at the computer system. The third line illustrates the document after the operation is performed. The fourth line illustrates the transformation of the operation received from the other computer system. The fifth line illustrates the document after the transformed operation is performed.

TABLE 2

| Computer b | Replace/Change | Computer a |
|---|---|---|
| abcdef | Case 0 | abcdef |
| (C, 4-6, u) | | (R, 2-4, "yyyy") |
| abc_def | | ayyyydef |
| (R, 2-4, "yyyy")→ | | (C, 4-6, u)→(C, 6-8, u) |
| (R, 2-4, "yyyy") | | |
| ayyyy_def | | ayyyydef |
| abcdef | Case 1 | abcdef |
| (C, 3-5, u) | | (R, 2-6, "yyyy") |
| abc_def | | ayyyyf |
| (R, 2-6, "yyyy")→ | | (C, 3-5, u)→no op |
| (R, 2-6, "yyyy") | | |
| ayyyyf | | ayyyyf |
| abcdef | Case 2 | abcdef |
| (C, 2-6, u) | | (R, 3-5, "yyyy") |
| abcdef | | abyyyyef |
| (R, 3-5, "yyyy")→ | | (C, 2-6, u)→(C, 2-8, u) |
| (R, 3-5, "yyyy") | | |
| abyyyyef | | abyyyyef |
| abcdef | Case 3 | abcdef |
| (C, 4-6, u) | | (R, 2-5, "yy") |
| abc_def | | ayyef |
| (R, 2-5, "yy")→ | | (C, 4-6, u)→(C, 4-5, u) |
| (R, 2-5, "yy") | | |
| ayye_f | | ayyef |
| abcdef | Case 4 | abcdef |
| (C, 2-5, u) | | (R, 3-6, "yyy") |
| abcdef | | abyyyf |
| (R, 3-6, "yyy")→ | | (C, 2-5, u)→(C, 2-3, u) |
| (R, 3-6, "yyy") | | |
| abyyyy | | abyyyy |

Figure 3:
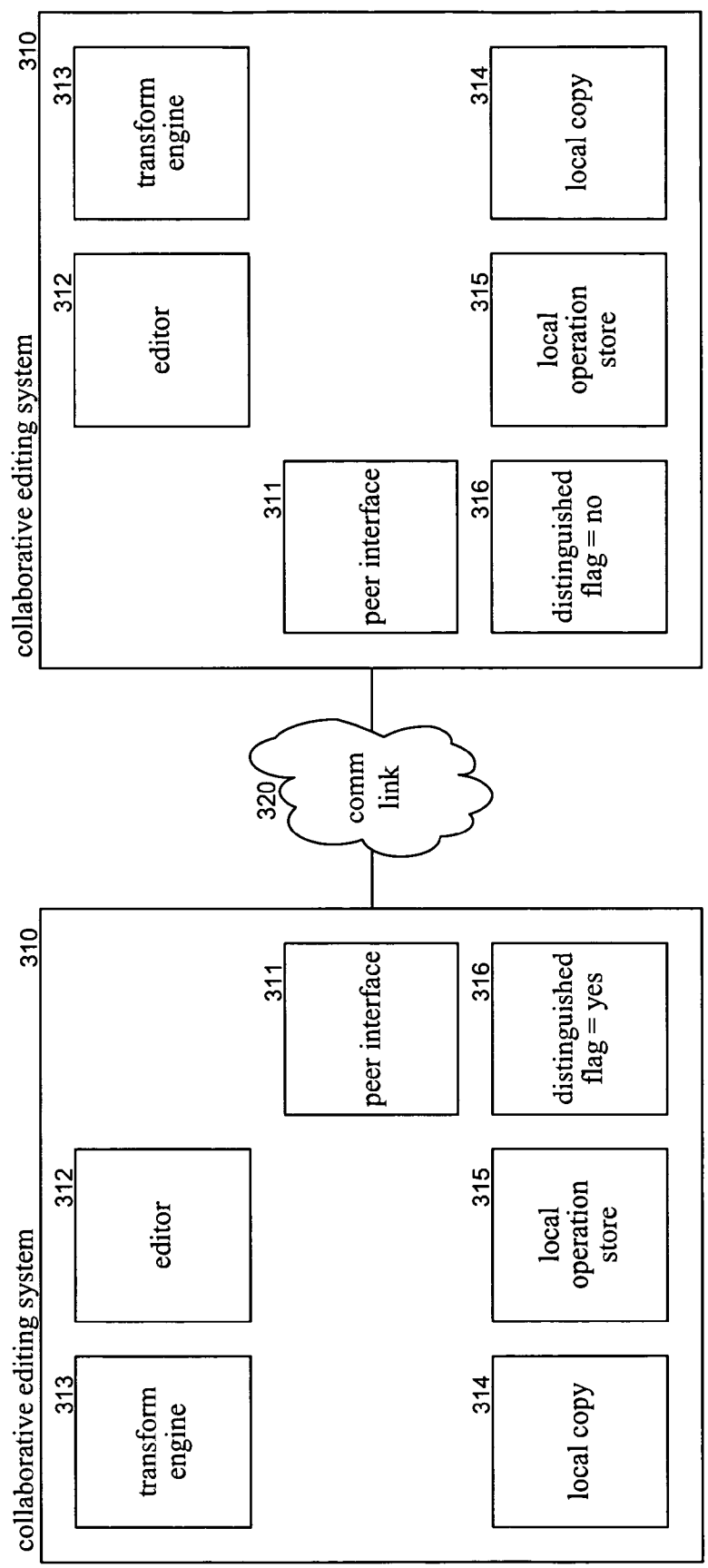
FIG. 3 is a block diagram illustrating components of the collaborative editing system in one embodiment.

FIG. 3 is a block diagram illustrating components of the collaborative editing system in one embodiment. The collaborative editing system 310 is implemented on peer computer systems that are connected via a communications link 320. The collaborative editing system includes a peer interface 311, an editor 312, a transform engine 313, a local copy store 314, a local operation store 315, and a distinguished flag 316. The peer interface controls the sending and receiving of operations between the peers. The editor controls the editing of the shared document that is stored in the local copy store. When the user modifies the document, the editor prepares an operation message and provides it to the peer interface for transmission to the other peer computer system. The editor also logs the operation in the local operation store for use in determining what operations were unapplied at the other peer computer system when an operation message is received. When the editor receives operation messages from the other peer computer system via the peer interface, it determines whether the received operation message indicates that it was applied at the peer computer system before all the operations of the local operation store were applied at that peer computer system. If so, the editor invokes the transform engine to transform the received operation as appropriate. The transform engine uses the distinguished flag to indicate whether this peer computer system is the distinguished computer system. One skilled in the art will appreciate that many different techniques may be used to identify the distinguished computer system. For example, the distinguished computer system may be the computer system with the lowest or highest number network address.

The computing device on which the collaborative editing system is implemented may include a central processing unit, memory, input devices (e.g., keyboard and pointing devices), output devices (e.g., display devices), and storage devices (e.g., disk drives). The memory and storage devices are computer-readable media that may contain instructions that implement the collaborative editing system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the collaborative editing system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The collaborative editing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
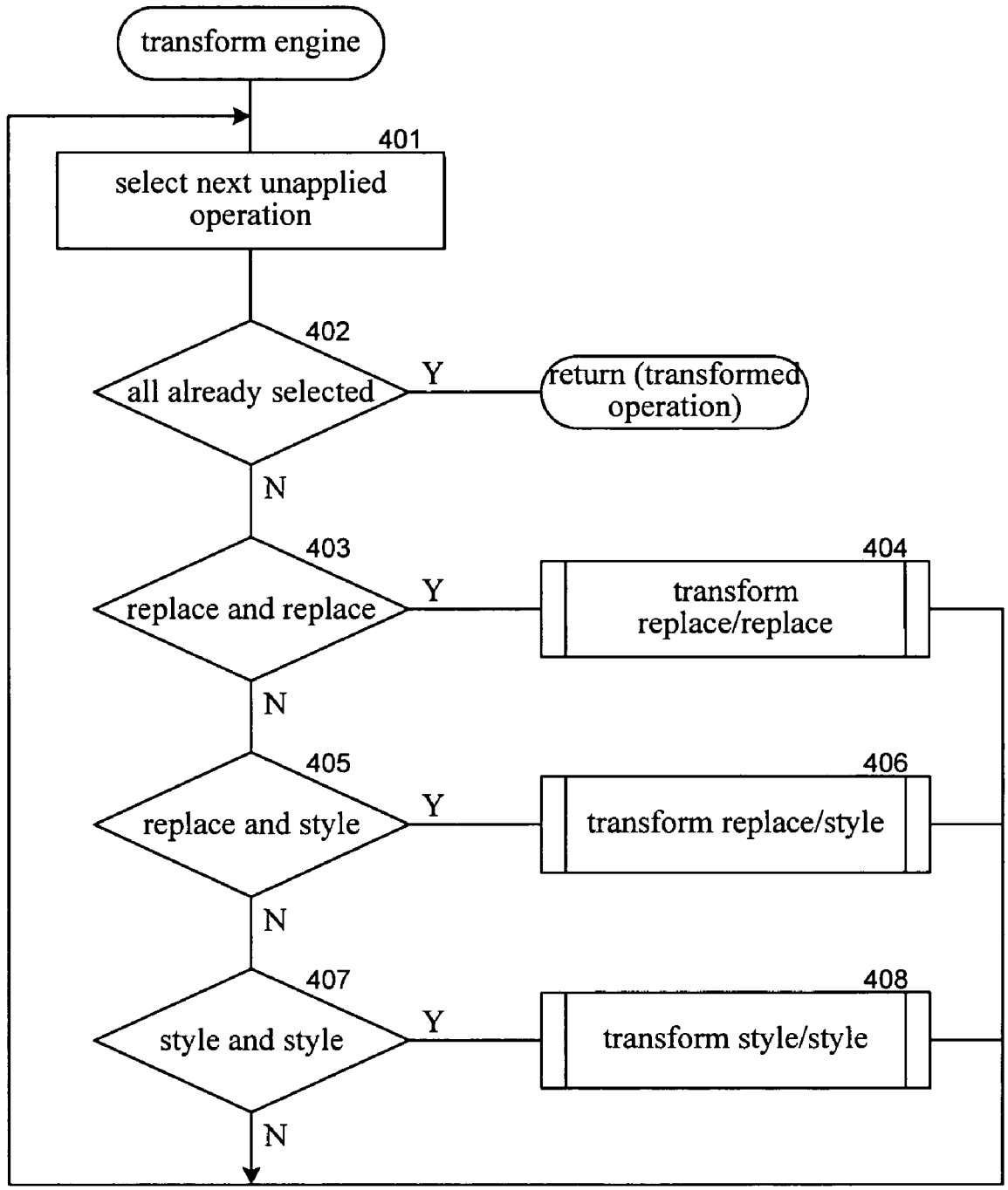
FIG. 4 is a flow diagram that illustrates the processing of the transform engine of the collaborative editing system in one embodiment.

FIG. 4 is a flow diagram that illustrates the processing of the transform engine of the collaborative editing system in one embodiment. The transform engine loops selecting operations from the local operation store that were not applied by the peer that sent the received operation and transforms the received operation based on the selected local operation. In block 401, the component selects the next unapplied operation from the local operation store. In decision block 402, if all the operations have already been selected, then the component returns the transformed operation, else the component continues at block 403. In decision block 403, if the selected operation and the received operation are both replace text operations, then the component continues at block 404, else the component continues at block 405. In block 404, the component invokes the transform replace/replace component. The transform replace/replace component may be a conventional component that implements operational transforms for pairs of replace operations. In decision block 405, if one operation is a replace text operation and the other operation is a change style operation, then the component continues at block 406, else the component continues at block 407. In block 406, the component invokes the transform replace/change component to transform the received operation. The transform replace/change component identifies the case (of FIG. 2) corresponding to the received operation and the selected operation and applies the corresponding transform. In decision block 407, if the received operation and the selected operation are both change style operations, then the component continues at block 408. In block 408, the component invokes the transform change/change component to transform the received operation. The change/change component identifies the case (of FIG. 1) corresponding to the received operation and the selected operation and applies the corresponding transform. The component then loops to block 401 to select the next unapplied operation.

From the foregoing, it will be appreciated that specific embodiments of the collaborative editing system have been described herein for purposes of illustration, but that various modifications may be made without deviating from the spirit and scope of the invention. One skilled in the art will appreciate that the collaborative editing system can be used to edit different types of data. For example, the data may be a text document with characters as objects and the formatting of the characters being the attributes. As another example, the data may be a slide presentation with the slides as objects and the formatting of the slides being the attributes. One skilled in the art will appreciate that the transformations of the collaborative editing system in one embodiment do not split operations into two different operations. Accordingly, the invention is not limited except as by the appended claims.

We claim:

1. A method for transforming operations on an attribute of data, the data being updated by multiple devices having a local copy of the data, each of the multiple devices having a memory and a processor, the method comprising:

applying by a first device a first operation to a first copy of the data and sending an indication of the first operation to a second device, the first operation having a first operator and a first range, wherein the applying is performed by the processor of the first device executing instructions stored in the memory of the first device;

applying by the second device a second operation to a second copy of the data and sending an indication of the second operation to the first device, the second operation having a second operator and a second range, wherein the applying is performed by the processor of the second device executing instructions stored in the memory of the second device;

when the second device did not apply the first operation before applying the second operation, transforming by the first device the second operation to resolve any conflict with the first operation and applying the transformed second operation to the first copy of the data after the first operation has been applied, wherein the applying is performed by the processor of the first device executing instructions stored in the memory of the first device and further wherein when the first range and the second range overlap, transforming the second operation comprises adjusting a first end of the second range without adjusting a second end of the second range; and when the first device did not apply the second operation before applying the first operation, transforming by the second device the first operation to resolve any conflict with the second operation and applying the transformed first operation to the second copy of the data after the second operation has been applied, wherein the applying is performed by the processor of the second device executing instructions stored in the memory of the second device and further wherein when the first range and the second range overlap, transforming the first operation comprises adjusting a first end of the first range without adjusting a second end of the first range, wherein the transforming ensures that after applying the transformed operations the first copy and the second copy of the data are consistent.

2. The method of claim 1 wherein the first copy and the second copy are consistent when the first and second devices are in a quiescent state.

3. The method of claim 1 including when the first operation and the second operation indicate to change the same attribute and the first range and the second range are the same, the second operation is transformed by the first device to have no effect on the first copy and the first operation is not transformed by the second device.

4. The method of claim 1 including when the first operation and the second operation indicate to change the same attribute and the first range encapsulates the second range, the second operation is transformed by the first device to change the attribute in the same way as the first operation and the first operation is not transformed by the second device.

5. The method of claim 1 including when the first operation and the second operation indicate to change the same attribute and the first range and the second range overlap, the second operation is transformed by the first device by adjusting the range to remove the overlap and the first operation is not transformed by the second device.

6. The method of claim 1 including when the first operation indicates to replace and the second operation indicates to change an attribute and the first range encapsulates the second range, the second operation is transformed by the first device to have no effect.

7. The method of claim 1 including when the first operation indicates to replace and the second operation indicates to change an attribute and the second range encapsulates the first range, the second operation is transformed by the first device so that the end of the range is adjusted by the delta of the first operation and the first operation is transformed at the second device to have the attribute value of the second operation.

8. The method of claim 1 including when the first operation indicates to replace and the second operation indicates to change an attribute and the first range overlaps the second range and starts before the second range, the second operation is transformed by the first device so that the start of the second range is set to the end of the first range adjusted by the delta of the first range and the end of the second range is adjusted by the delta of the first range and the first operation is not transformed by the second device.

9. The method of claim 1 including when the first operation indicates to replace and the second operation indicates to change an attribute and the second range overlaps the first range and starts before the first range, the second operation is transformed by the first device by setting the end of the second range to the start of the first range and the first operation is not transformed by the second device.

10. A computer-readable storage medium containing instructions for controlling a first device to transform operations on the text style of text of a document, the document being updated by multiple devices in a collaborative editing environment, each device having a local copy of the document, by a method comprising:

applying a first operation to a first copy of the document maintained at the first device and sending an indication of the first operation to a second device, the first operation having a first operator and a first range;

receiving from the second device a message with an indication of a second operation that has been applied by the second device to a second copy of the document, the second operation having a second operator and a second range;

determining whether the received message indicates that the second device did not apply the first operation to the second copy of the document before applying the second operation to the second copy of the document;

upon determining that the second device did not apply the first operation to the second copy of the document before applying the second operation to the second copy of the document, transforming the second operation to resolve any definite conflict with the first operation in favor of a distinguished device and applying the transformed second operation to the first copy of the document after the first operation has been applied to the first copy of the document wherein when the first operation and the second operation are to change the same style type of text and the first range overlaps the second range but does not encapsulate the second range,
when the first range starts before the second range, and the first device is the distinguished device, transforming the second operation by setting the start of the second range to the end of the first range without adjusting the end of the second range, and
when the first range starts after the second range, and the first device is the distinguished device, transforming the second operation by setting the end of the second range to the start of the first range;
when the first operation and the second operation are to change the same style type of text, the first range overlaps the second range but does not encapsulate the second range, and the second device is the distinguished device, not transforming the second operation; and
when the first operation and the second operation are to change the same style type of text and the first range encapsulates the second range, transforming the second operation by setting its attribute to the attribute of the first operation wherein the transforming ensures that after applying the operations the first copy and the second copy of the data are consistent when the first and second devices are in a quiescent state and wherein at least one of the first operator and the second operator relate to changing the style of text of the document.

11. The computer-readable storage medium of claim 10 wherein the distinguished device is a server and the devices are clients.

12. The computer-readable storage medium of claim 10 wherein the distinguished device is a designated peer and the devices are peers.

13. The computer-readable storage medium of claim 10 wherein the distinguished device is the second device.

14. A computer system having a memory and a processor for transforming operations on an attribute of data, the data being updated by multiple devices having a local copy of the data, comprising:

a component that applies a local operation to the local copy of the data, the local operation having a local operator and a local range;
a component that receives an indication of a remote operation that has been applied by a device to a remote copy of the data, the remote operation having a remote operator and a remote range;
a component that determines which of the multiple devices is a distinguished device based at least in part on a network address of each device; and
a component that, when the remote device did not apply the local operation before applying the remote operation and the local operator and the remote operator are for adjusting the attribute of the data, transforms the remote operation to resolve any definite conflict with the local operation in favor of a distinguished device and applies the transformed remote operation to the local copy of the data after the local operation has been applied wherein the components are stored as instructions in the memory for execution by the processor.

15. The computer system of claim 14 wherein the transforming of the remote operation does not split the remote operation into two operations.

16. The computer system of claim 14 wherein the component that determines which of the multiple devices is a distinguished device based at least in part on the network address of each device determines that the device with the highest network address is the determined device.

17. The computer system of claim 14 wherein the component that determines which of the multiple devices is a distinguished device based at least in part on the network address of each device determines that the device with the lowest network address is the determined device.

* * * * *

UNITED STATES PATENT AND TRADEMARK OFFICE
CERTIFICATE OF CORRECTION

PATENT NO.        : 7,792,788 B2
APPLICATION NO.   : 11/073418
DATED             : September 7, 2010
INVENTOR(S)       : Keith Melmon et al.

Page 1 of 1

It is certified that error appears in the above-identified patent and that said Letters Patent is hereby corrected as shown below:

In Title page, in field (54), under "Title" column 1, line 2, after "CONFLICTS" insert -- IN ATTRIBUTE --.

In column 1, line 2, after "CONFLICTS" insert -- IN ATTRIBUTE --.

Signed and Sealed this
First Day of February, 2011

David J. Kappos
*Director of the United States Patent and Trademark Office*